May 5, 1925.
H. C. ANDERSON
1,536,743
RESILIENT DISK WHEEL
Filed June 27, 1923
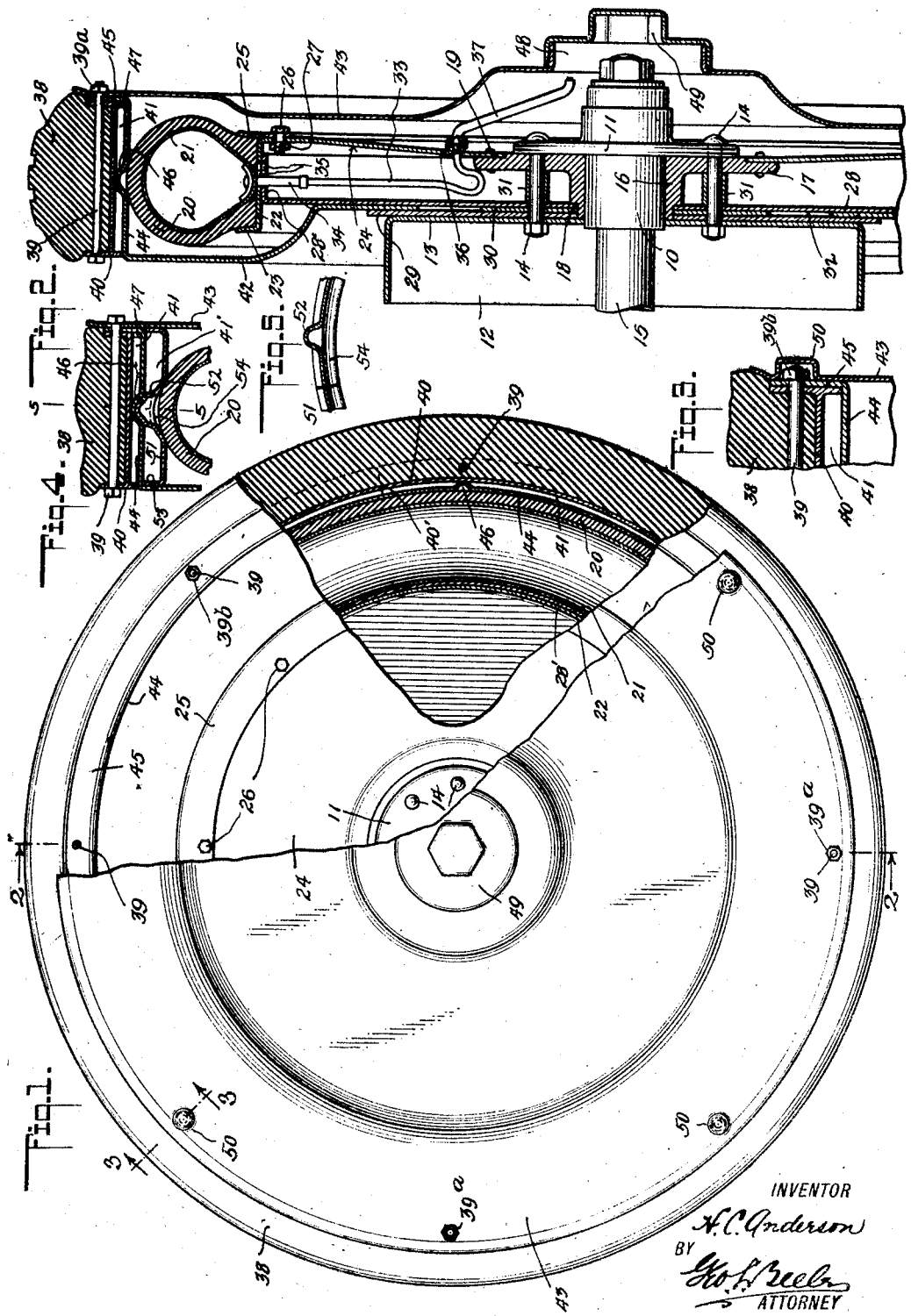
INVENTOR
H. C. Anderson
BY
Geo. L. Beebe
ATTORNEY Patented May 5, 1925.

1,536,743

UNITED STATES PATENT OFFICE.

HIRAM C. ANDERSON, OF NEW YORK, N. Y.

RESILIENT DISK WHEEL.

Application filed June 27, 1923. Serial No. 647,974.

*To all whom it may concern:*

Be it known that I, HIRAM C. ANDERSON, a citizen of the United States, residing at New York city, borough of the Bronx, in the county of Bronx and State of New York, have invented certain new and useful Improvements in Resilient Disk Wheels, of which the following is a specification.

This invention relates to vehicle wheels and especially to disk wheels of the pneumatic type, the same constituting an improvement on the wheel construction covered by Letters Patent of the United States, No. 1,425,623, issued to me on the 15th day of August, 1922.

Among the objects of this present improvement is to provide a disk wheel construction adaptable with slight expense or inconvenience to standard axles and hubs of various types of vehicles; to provide a better construction of outer tread rim mechanism; to provide means for adapting the tread construction to various sizes or diameters of inner pneumatic wheel constructions, and other advantages that will be apparent as this description progresses.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of a preferred embodiment of the invention, parts being broken away to indicate the inner construction.

Fig. 2 is a vertical section on the line 2—2 of Fig. 1.

Fig. 3 is a sectional detail on the line 3—3 of Fig. 1.

Fig. 4 is a partial section corresponding to the upper portion of Fig. 2, including an added feature adapting the construction to a smaller inner wheel.

Fig. 5 is a partial longitudinal section on the line 5—5 of Fig. 4, indicating particularly the construction of the auxiliary or spacer rim.

Referring now more specifically to the drawings, I represent a resilient disk wheel, in the nature of a wheel within a wheel, the two wheels being normally concentric with each other but subject to axial displacement within limited degrees in operation or while supporting a load.

10 indicates a standard hub of well known type, the same having an integral flange 11 adjacent to its outer end, and spaced inward from its flange is a brake drum 12 having an attachment flange 13. Between the flanges 11 and 13 extend a circular series of tie bolts 14 parallel to the axis of the axle 15 to which the hub is connected in any well known manner.

Mounted upon the hub 10 between the flanges 11 and 13 is what I term a hub adapter 16, the same having a main cylindrical hub portion fitted directly upon the hub 10 and having a strong integral disk-like flange 17 extending radially from the outer end of the adapter against the inner surface of the hub flange 11, the tie bolts 14 passing through the adapter flange and so serving to lock the hub and the adapter rigidly together for simultaneous rotation. It will be understood that the specific design of the adapter will be determined by the construction of any standard type of hub to which the improved wheel is to be attached. In the form shown the inner end of the adapter, the end remote from the end of the axle or outer face of the hub, is provided with an exterior rabbet 18, while the periphery of the flange 17 is rabbeted at 19 on its outer face radially outward from the periphery of the hub flange 11.

The inner wheel is shown fitted with a pneumatic tire 20 having an inner tube 21 of any well known or approved construction, said tire being fitted upon a rim 22 having an integral straight sided flange 23 on the inside. Said rim 22 is an integral part of an outer disk 24 whose hub portion is fixed in the rabbet 19 above described, and the tire 20 is held upon the rim 22 by means of an outer side ring or flange 25 detachably secured to the rim portion of the disk 24 by means of bolts or screws 26 tapped into burrs 27 preferably formed or otherwise fixed upon the inner surface of this part of the disk 24. This inner wheel is stiffened and strengthened by means of an inner disk 28, the main portion of which is substantially flat and fitted upon the rabbet 18, parallel but spaced slightly from the brake drum flange 13. The periphery of the disk 28 has a flange 28' at right angles to the main portion of the disk and fitted within the rim 22.

Fitted also in the rabbet 18 are two spacing plates in the nature of disks 29 and 30, the former being somewhat greater in diameter than the brake drum against which it lies, while the latter is materially smaller in diameter than but concentric with the plate 29. The plate 30 lies between the plate 29 and the inner wheel disk 28, and all of these parts are locked rigidly and strongly together by the tie bolts. Spacer thimbles 31 surrounding the tie bolts extend between the adapter flange 17 and the series of disks just described. The construction of the disks 28, 29, and 30 provides an annular space 32 surrounding and in the same plane as the plate 30.

The air tube in this construction is in general terms similar to that shown and claimed in my previous patent, the same consisting of a long flexible tube 33 connected to a nipple 34 leading from the inner tube inward through the registering holes 35 in the rim 22 and flange 28'. The inner end of the flexible tube 33 is tapped into a hole formed at 36 in the outer disk 24 near the adapter flange 17. This hole is formed by punching outward the disk, and the metal so punched is tapped both inside and outside. 37 indicates a rigid extension threaded upon the outer portion of this tapped member and having its free end located adjacent to the outer end of the hub or axle and is adapted for the attachment of any suitable air pump device in a well known manner.

The outer wheel is shown comprising a solid or cushion tread 38 of any suitable construction or design and shown as locked by means of a series of bolts 39, shown as eight in number, in a detachable rim 40. This rim may be split at 40' to facilitate assemblage. This rim is indicated in cross section as of I-formation or with an outer channel to receive the tread 38 and with inward extensions forming an air space 41. The outer wheel includes also inner and outer disks 42 and 43 respectively, the inner disk having a rim flange 44. This flange and the cylindrical portion of the detachable rim 40 are parallel to the axis of the wheel and between them is the dead air space 41. The width of the flange 44 is slightly greater than the rim 40 so that the latter is seated firmly upon it. The rim 44 is provided at its otherwise free edge with a flat flange 45 extending radially outward and lying flush against the outer flat flange portion of the detachable rim.

The rim flange 44 of the inner disk 42 is indicated as of generally cylindrical form along its contact with the tread of the inner tire 20, but provided with a series of projections 46 swaged outward radially therefrom toward or against the inner surface of the cylindrical portion of the detachable rim 40. The outer flange of the rim 40 is preferably notched at 47 at its inner edge to facilitate the assemblage of these parts. These projections 46 not only stiffen the rim construction, but provide cups serving to make a more effective non-slip connection between the inner and the outer wheels at their tread portions. The outer disk 43 is spaced freely from the end of the axle and is provided with a hub opening 48 through which the tube 37 is available when the normally closed cap 49 is removed. The periphery of the disk 43 is detachably connected to the other parts of the wheel by operation of the bolts 39, indicated as one-half of said bolts in alternation, the nuts 39$^a$, four in number, binding the periphery of the disk 43 against the flange 45, while the remaining nuts 39$^b$ are embraced by cups 50 struck outward from the disk.

While this wheel is designed to be assembled and operated as already described and as shown in Fig. 2, in some installations the inner wheel may be smaller in diameter so that a spacer rim 51 as shown in Figs. 4 and 5 may be desirable. This spacer rim is inserted in the outer wheel just within the rim flange 44 and is held spaced therefrom either by means of outward radial projections 52 co-operating with the flange 44 or by means of edge flanges 53 bearing radially outward against the inner surface of the flange 44. I usually provide this spacer rim also with a circumferential channel 54 for additonal stiffening. The projections 52 extend outward radially from the crest of the channel 54 and co-operate with the projections 46. This construction provides an additional air space 41'. By virtue of these air spaces the heat generated at the outer tread 38 which in many cases is terrific, can never affect the vital inner pneumatic construction.

I claim:

1. In a disk wheel construction, inner and outer disks, the inner disk having a cylindrical rim flange against which the outer disk is secured, an inner wheel between said disks comprising pneumatic cushion means between the disks and bearing outward radially toward the rim flange, an outer tread, and means to secure the outer tread to the disk construction first mentioned, said securing means including a rim having a cylindrical portion and flat flanges extending both inward and outward from its edges, the tread member being seated between the outwardly extending flanges while the inwardly extending flanges in co-operation with the rim flange form a dead air space, substantially as set forth.

2. Mechanism as set forth in claim 1 in which an auxiliary spacer rim is inserted between the disks and bears outward radially against the rim flange for adapting the wheel for inner pneumatic cushion means of smaller diameter.

3. In disk wheel construction, the combination with a relatively wide tread rim and a tread adapted to be supported thereby, of securing means for attaching said tread to the rim comprising a cylindrical portion having flanges extending inward and outward therefrom, the tread member being seated between the outwardly extending flanges, while the inwardly extending flanges abut against said rim so as to rest thereon and to form in co-operation therewith a dead air space.

4. The combination as in claim 3 wherein said rim has a flange along a side thereof to which said securing means is fastened.

In testimony whereof I affix my signature.

HIRAM C. ANDERSON.